3,465,068
PHOSPHORUS-CONTAINING ESTERS AND PROCESS THEREFOR

Vasco G. Camacho, James J. Anderson, and Wendell M. Byrd, Jr., Richmond, Va., assignors to Mobil Oil Corporation, a corporation of New York
No Drawing. Filed Mar. 24, 1966, Ser. No. 536,978
Int. Cl. C07f 9/08, 9/40; C08k 1/60
U.S. Cl. 260—952     25 Claims

ABSTRACT OF THE DISCLOSURE

Phosphorus-containing compounds which are useful in the preparation of polyurethanes and which are derived from (1) phosphorus compounds containing at least one active function, (2) alkylene oxides or epihalohydrin and (3) dicarboxylic acid anhydrides are provided. Among the compounds are those prepared by reacting a dicarboxylic acid anhydride with a phosphorus acid which has been partially or completely reacted with an alkylene oxide or epihalohydrin, followed by reaction of the carboxyl group thus formed with additional alkylene oxide or epihalohydrin. Methods for preparation of the compounds are also provided.

---

This invention relates to new and novel phosphorus compounds and to a process for their manufacture. More particularly, the invention is concerned with compounds prepared from compounds of phosphorus containing at least one active site, dicarboxylic acid anhydrides, alcohols, phenols, and alkylene oxides or epihalohydrins. Specifically the compounds of the present invention are represented by the formulas (1) 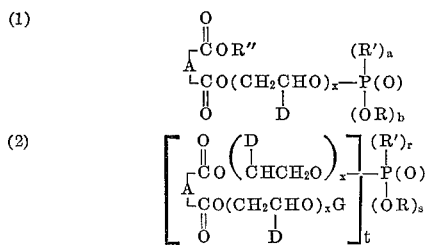

(2) 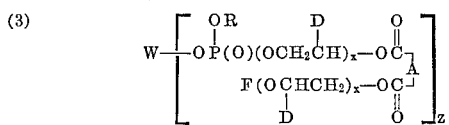

and (3) 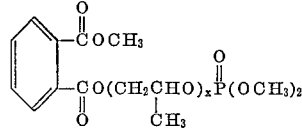

wherein:

R is a member of the group consisting of (lower) alkoxy (lower) alkyl, alkyl containing from 1 to 18 carbon atoms, aryl, alkyl-substituted aryl, wherein the alkyl contains from 1 to 18 carbon atoms, chloro-substituted aryl, bromo-substituted aryl, aralkyl, and

wherein D and $x$ are hereinafter defined;

R' is a member of the group consisting of hydrogen, alkyl containing from 1 to 18 carbon atoms, and phenyl;

R" is a member of the group consisting of alkyl containing from 1 to 13 carbon atoms and (lower) alkoxy (lower) alkyl;

A is the nucleus of a member of the group consisting of aromatic dicarboxylic anhydrides and aliphatic dicarboxylic anhydrides;

D is a member of the group consisting of hydrogen, lower alkyl and chloro (lower) alkyl;

G is a member of the group consisting of hydrogen and $$-\underset{(OR)_b}{\overset{(R')_a}{P}}(O)$$

wherein R and R' are as hereinabove defined and $a$ and $b$ are as hereinafter defined;

$a$ and $b$ are each 0 to 2, their sum being 2;

$r$, $s$, and $t$ are, respectively, 0 to 2, 0 to 2 and 1 to 3, their sum being 3;

W is the hydrocarbyl nucleus of a polyhydroxy compound containing from 2 to 4 hydroxyls;

$x$ has an average value of from about 1.0 to about 5.0; and $z$ is an integer corresponding to the number of hydroxyls in W.

There are several categories of chemicals which fall within the above generic definition, but for purposes of illustrating this invention, three will be discussed in general and specific terms, particularly with respect to methods for their preparation.

The simplest class of products falling within the above generic definitions may be represented by the compound

which is prepared by (1) reacting phthalic anhydride with an equimolar quantity of methyl alcohol, (2) neutralizing the acid function thus formed with propylene oxide, and (3) reacting this neutral product with dimethyl phosphorochloridate, in the presence of a halogen acid acceptor, if desired. Whereas the particular phosphorus-containing compound shown is a derivative of phosphoric, the class, as is evident from the generic formulas shown above, includes phosphorus-containing compounds which have one or two carbon-to-phosphorus bonds in the molecule.

The second class of compounds contemplated by the present invention is prepared by the simultaneous reaction of an aromatic or aliphatic dicarboxylic acid anhydride, a compound of phosphorus containing at least one reactive hydrogen atom, and an alkylene oxide. The compounds of this class are monomeric with respect to each reactive hydrogen and anhydride, they are neutral, and they may contain as many anhydrides as there are active hydrogens in the phosphorus compound used. The following members will illustrate the scope contemplated by this second class.

(1)

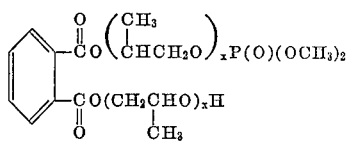

and the same type of compound wherein one or both of the right-hand phosphorous ester portions may be replaced with one or two aromatic or aliphatic groups bound to carbon.

(2)

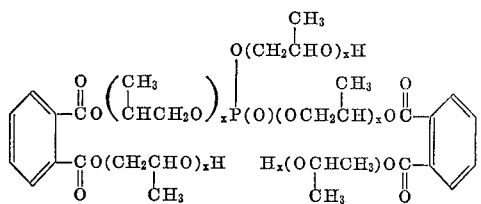

and the same compound wherein

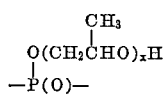

may be replaced, for example, by

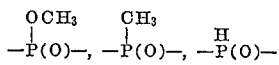

or

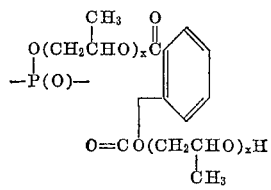

The compounds of this class may be prepared in a three-step process, involving (1) the oxyalkylation of the phosphorus compound, (2) the reaction of the product thus formed with the anhydride, and (3) the neutralization of this product with additional alkylene oxide. For example, (1) above can be prepared using the three-step process essentially in the following manner:

(a)

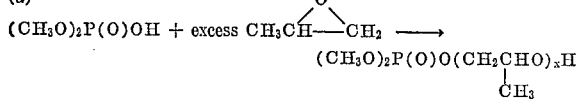

(b)

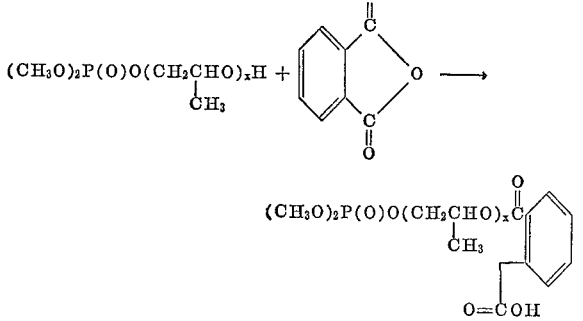

(c)
(b) + $CH_3CH\underset{O}{-}CH_2 \longrightarrow$

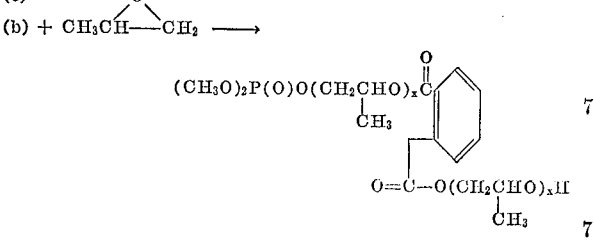

It is obvious from this series of steps that only discrete molecules are possible, since under normal conditions the carboxyl groups formed in step (b) will not react with the remaining anhydride to open its ring, nor with alcoholic OH groups present in the mixture to form additional polyester links by splitting out water.

As mentioned previously, these compounds may be prepared by the simultaneous reaction of a phosphorus compound, an anhydride, and an alkylene oxide. The products formed in this manner are similar to those obtained using the above-outlined three-step process. This was surprising in view of the normally expected sequence of reactions in a system containing the named components, since the very nature of these reactions would logically exclude any expectation of discrete chemicals.

It is well-known that alkylene oxides will react with the acid functions of a phosphorus acid to yield a compound which is terminated with one or more hydroxyl groups. It is further known that the active hydrogen thus formed will react with an anhydride, opening its ring to give an ester group and a carboxyl group. In the presence of alkylene oxide, one would expect this carboxyl to compete with the phosphorus acid for oxide addition. If this were to occur there would exist a different ester capable of reacting with the anhydride present, the ester portion being attached to one position of the ruptured ring and another carboxyl being formed at the other position. If this process were repeated many times during the course of a reaction involving the named materials, one would obtain a polymeric product, not one which is essentially monomeric, i.e. one similar to a product from the three-stop process given hereinbefore.

The single-step, or simultaneous, process for the production of the chemicals of this class does not necessarily means that all of the anhydride, phosphorus compound and alkylene oxide are brought together initially. This may be impractical in view of the extreme reactivity of the phosphorus acid and oxide. Thus, the preferred reaction order involves mixing the anhydride and phosphorus acid, followed by the step-wise addition of oxide to this mixture. It will be obvious, however, that any equivalent variation of this, such as mixing anhydride and oxide, with subsequent addition of phosphorus acid to this mixture, can be used and still be within the one-step process contemplated by the present invention.

In practicing the preferred form of the process for producing this second class of chemicals, a dicarboxylic acid anhydride and acid of phosphorus are placed together within a pressure apparatus. Alkylene oxide is then fed into the mixture, the addition thereof is begun at room temperature, and the heat of reaction is allowed to carry the temperature to 80–95° C., the temperature of reaction being maintained at or near the top of this range until all of the oxide is added. Alternatively, the mixture may be heated to form 70° to 90° C. prior to beginning addition of oxide. Upon the completion of this initial reaction, excess oxide, preferably in a total molar ratio of (2 to 2.5) times the number of acid functions to be neutralized, is fed into the reaction vessel, the temperature is raised to 120–125° C. and maintained there for from 1 to 8 hours to complete neutralization of the carboxyl hydrogens formed upon the reaction between the alkoxylated acid and anhydride. Excess oxide is removed in vacuo. The mixture is continuously stirred throughout the reaction.

The temperature of reaction may be as high as about 160° C. during the process without any adverse effects on the desired product, but is usually, and preferably, within the range of about 80° to about 125° C. The times to complete the reaction will vary with the temperature used, and with the kind and amount of anhydride employed, but will generally run from about 1 to 8 hours. If the temperature of the reaction is permitted to exceed about 160° C., it will have a detrimental effect on the product. Since it is known that high temperatures are required for esterification, it follows that the higher the temperature the greater the chance for a carboxyl group to be esterified by reaction with the alkoxylated phosphorus acid. Therefore, temperatures where esterification will occur must be avoided.

The third general class of members contemplated by this invention are those in which the active hydrogens of the class (2) compounds are capped off by reacting them with a phosphorus compound of the type

wherein R, R', $a$ and $b$ is as defined hereinbefore and Hal is halogen. Generally, this is done by reacting a quantity of

equivalent to the amount of hydroxyls present in the compound in question.

Included among the dicarboxylic acid anhydrides which are suitable for the purposes of this invention are:

ALIPHATIC ANHYDRIDES

Adipic, azelic, glutaric, suberic, itaconic, pimelic, succinic, acetonedicarboxylic, maleic, chloromaleic, dichloromaleic (and other halo-substituted aliphatic), dimethylmaleic, n-decylsuccinic (and other alkylsubstituted anhydrides wherein the alkyl has from 1 to 12 carbon atoms), hydrophthalic (as dihydrophthalic, tetrahydrophthalic and hexahydrophthalic), endomethylene phthalic, camphoric, 5-norbornene-2, and chlorendic [1,4,5,6,7,7-hexachlorobicyclo-(2,2,1)-5-heptene-2,3-dicarboxylic];

AROMATIC ANHYDRIDES

Phthalic, 3-chlorophthalic, 4-chlorophthalic, tetrachlorophthalic, 3-bromophthalic, 4-bromophthalic, tetrabromophthalic, 3-iodophthalic, 4-iodophthalic (and other halo-substituted phthalics), 3-nitrophthalic (and other nitro-substituted phthalics), 3-methylphthalic, 4-methylphthalic (and other alkyl-substituted phthalics where the alkyl has from 1 to 12 carbon atoms), homophthalic, and naphthalic.

Included among the phosphorus acids are:

PHOSPHORUS ACIDS

Unsubstituted phosphoric, pyrophosphoric, and polyphosphoric acids

Monoalkyl and ialkyl esters of phosphoric acid: methyl, ethyl, propyl, butyl, pentyl, hexyl, decyl, dodecyl, octadecyl, and 2-butoxyethyl;

Monoaryl and diaryl esters of phosphoric acid: phenyl, Cl-phenyl, Br-phenyl, 2,4-Cl$_2$-phenyl, 2,5-Cl$_2$-phenyl, 2,4,6-Cl$_3$-phenyl, and naphthyl;

Monoalkaryl and dialkaryl esters of phosphoric acid: methylphenyl, ethylphenyl, propylphenyl, butylphenyl, octylphenyl, nonylphenyl, decylphenyl, dodecylphenyl, octadecylphenyl, 1-methyl naphthyl, and xylyl;

Monoaralkyl and diaralkyl esters of phosphoric acid: benzyl and phenethyl.

Included are the following phosphonic and phosphinic acids:

PHOSPHONIC ACID

RP(O)(OH)$_2$ where R is methyl, ethyl, propyl, butyl, pentyl, hexyl, octyl, decyl, dodecyl, octadecyl, and phenyl;

RP(O)OH(OR')

where R and R' are selected from methyl, ethyl, propyl, butyl, pentyl, hexyl, octyl, nonyl, decyl, dodecyl, octadecyl, and phenyl.

PHOSPHINIC ACID

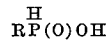

where R is methyl, ethyl, propyl, butyl, pentyl, hexyl, octyl, decyl, dodecyl, and octadecyl;

R$_2$P(O)OH where R is methyl, ethyl, propyl, butyl, pentyl, hexyl, and phenyl.

The following examples will illustrate the compounds of the present invention. It is to be understood, however, that they are merely for the purpose of illustration, and are not necessarily to limit the invention.

EPOXIDES

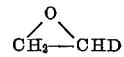

where D is hydrogen, CH$_3$, C$_2$H$_5$ and ClCH$_2$, that is, where the epoxides may be ethylene oxide, propylene oxide, butylene oxide and epichlorohydrin.

EXAMPLE 1

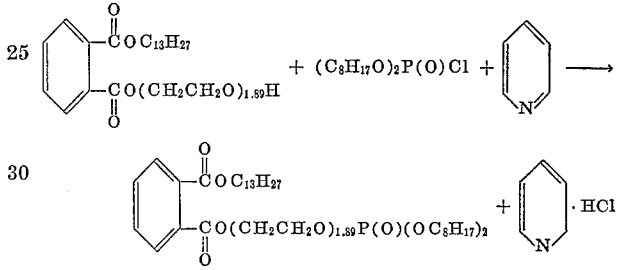

Ethoxylated tridecyl acid phthalate, 344.6 parts, pyridine, 69.6 parts, and hexane, 395 parts, were placed in a reaction vessel provided with a stirrer, thermometer and means for cooling. 274.2 parts of bis(2-ethylhexyl) phosphorochloridate was added to this solution, with stirring, at 10° C. or below. When the addition was completed, the cooling means was removed, and the mixture was stirred for 2 hours and 15 minutes, after which it was washed with 1000 parts of water, then with 500 parts of 8% sodium carbonate solution, and finally with two portions of water, 1000 parts for each wash.

The hexane was removed in vacuo to a final pot temperature of 125° C. and a final pressure of 10 mm. of Hg. The product, a clear, light golden yellow liquid, had the following properties:

Total acid 3.2 mg KOH/g.
P (calculated) 4.2%; P (found) 4.3%

EXAMPLE 2

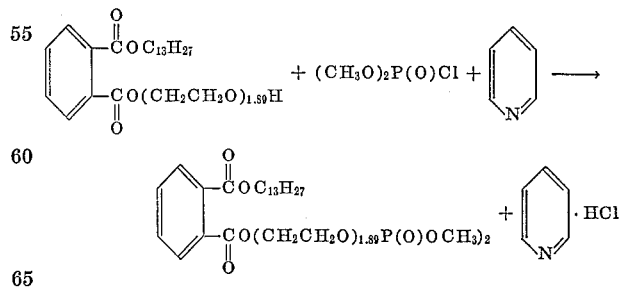

In a process similar to that of Example 1, 430.7 parts of the ethoxylated acid phthalate, 151.7 parts of dimethyl phosphorochloridate, 87.0 parts of pyridine, and 378 parts of benzene gave a product which was light yellow in color, and which had a total acid of 2.5 mg. KOH/g. Theoretical phosphorus was calculated as 5.8%; 5.1% phosphorus was detected in the product.

The following table summarizes other compounds which have been prepared using a process similar to that of Example 1.

| Compound | | Total acid, mg. KOH/gm. | Density, 20/4 | Refractive index at °C. | P, percent Calcd. | Found |
|---|---|---|---|---|---|---|
| Example: 3 | phthalate with -COOCH₃ and -CO(CH₂CH₂O)₂.₈₇P(O)(OCH₃)₂ | 0.62 | 1.289 | 1.4994 at 28 | | |
| 4 | phthalate with -COOC₄H₉ and -CO(CH₂CH₂O)₂.₄₃P(O)(OCH₃)₂ | 1.16 | 1.235 | 1.4996 at 28 | | |
| 5 | phthalate with -COOC₈H₁₇ and -CO(CH₂CH₂O)₁.₈P(O)(OCH₃)₂ | 0.44 | 1.163 | 1.4840 at 27 | | |
| 6 | phthalate with -COOCH₃ and -CO(CH₂CHO)₂.₅₈P(O)(OCH₃)₂ with CH₃ branch | 2.39 | 1.243 | 1.495 at 27.5 | | |
| 7 | phthalate with -COOC₄H₉ and -CO(CH₂CHO)₁.₉₂P(O)(OCH₃)₂ with CH₃ branch | 1.50 | 1.198 | 1.4878 at 27 | | |
| 8 | phthalate with -COOC₈H₁₇ and -CO(CH₂CHO)₂P(O)(OCH₃)₂ with CH₃ branch | 3.59 | 1.134 | 1.4846 at 27 | | |
| 9 | phthalate with -COOC₁₃H₂₇ and -CO(CH₂CHO)₁.₅P(O)(OCH₃)₂ with CH₃ branch | 1.11 | 1.087 | 1.4811 at 27 | | |
| 10 | phthalate with -COOC₁₃H₂₇ and -CO(CH₂CHO)₁.₅₄P(O)(OC₈H₁₇)₂ with CH₃ branch | 7.1 | 1.024 | 1.4726 at 24 | 4.20 | 4.38 |
| 11 | phthalate with -COOCH₂CH₂OC₄H₉ and -CO(CH₂CH₂O)₁.₈₆P(O)(OCH₃)₂ | 0.54 | 1.228 | 1.4877 at 25 | | |

EXAMPLE 12

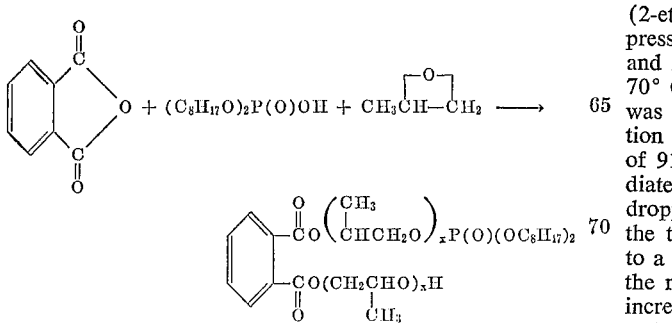

where $x = 1.34$ (average).

Phthalic anhydride, 145.2 parts and 322.4 parts of bis (2-ethylhexyl) hydrogen phosphate were placed into a pressure apparatus equipped with a stirrer, thermometer and means for adding oxide. The mixture was heated to 70° C., and while stirring, 232.3 parts of propylene oxide was added over a period of 8 minutes. During the addition of oxide, the temperature increased to a maximum of 91° C., and the pressure increased to 26 p.s.i. Immediately after completing the addition, the temperature dropped to 68° C. During a two hour stirring period, the temperature was carried, by external heating means, to a maximum of 102° C., the last one hour being within the range of 90–102° C. The maximum pressure, which increased gradually over this period, was 69 p.s.i.

At the end of this heating period, the product had an acid number of 126 mg. KOH/gm. The product was heated for a further hour at 119–123° C., after which the acid content was 0.9 mg. KOH/gm. Excess oxide was removed in vacuo, the final pot temperature being 110° C., at 10 mm. Hg.

The product, a golden brown, viscous liquid, had the following properties:

OH (calculated), 89 mg. KOH/gm.; OH (found), 104.5 mg. KOH/gm.
P (calculated), 5.02%; P (found), 4.96%.
Density 20/4, 1.093.
Refractive index at 26° C., 1.4790.
Total acid 0.14 mg. KOH/gm.

In a manner similar in all material aspects to Example 12, the following compounds were prepared:

EXAMPLE 20

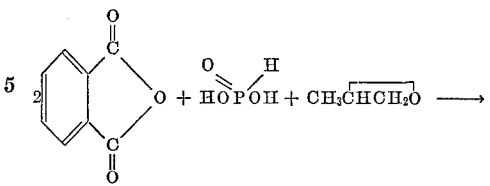

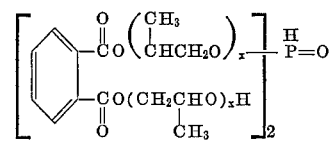

where $x=2.25$ (average).

| Ex. | Compound | X avg. | OH, mg. KOH/gm. Calcd. | OH, mg. KOH/gm. Found | P, percent Calcd. | P, percent Found | Density; 20/4 | Refractive index at ° C. | Total acid, mg. KOH/gm. |
|---|---|---|---|---|---|---|---|---|---|
| 13 | 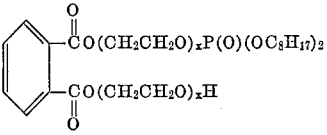 | 1.29 | 95 | 112.5 | 5.35 | 5.17 | 1.113 | 1.4819 at 25 | 0.12 |
| 14 | 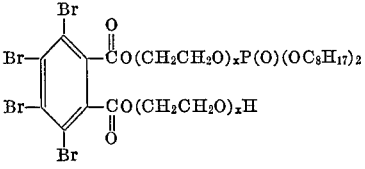 | 1.34 | 61.5 | 70.4 | 3.47 | 3.48 | 1.536 | 1.5285 at 25.5 | 0.05 |
| 15 | 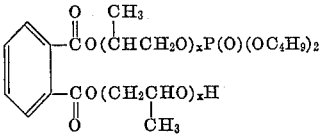 | 1.15 | 113.1 | 107 | 6.36 | 6.31 | 1.124 | 1.4834 at 24 | 0.15 |
| 16 | 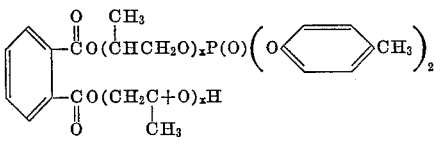 | 1.45 | 93.3 |  | 5.28 | 5.15 |  | 1.5335 at 24 | 0.11 |
| 17 | 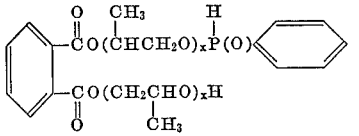 | 1.38 | 126.2 | 132.0 | 6.68 | 6.79 |  |  | 0.10 |
| 18 | 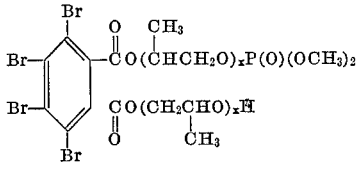 | 1.21 |  |  |  |  |  |  |  |
| 19 | 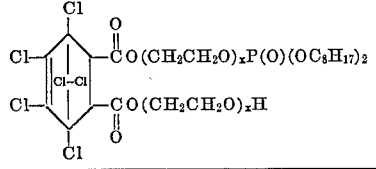 | 1.0 |  |  | 3.82 | 3.89 |  | 1.4958 at 25 | 0.06 |

Phthalic anhydride, 296.2 parts, 82.0 parts of phosphorous acid and 0.04 part of sodium formate were placed in a pressure apparatus equipped with a stirrer, thermometer and oxide addition means, and the mixture was heated to 70° C. 548.5 parts of propylene oxide was added to the mixture, with stirring, over a period of 4½ hours, the temperature varying from about 90° C. to 134° C. The reaction mixture was then stirred for 5 hours at 120–125° C., after which the excess oxide was removed by stripping at 120–125° C. at 10 mm. of Hg, giving a slightly yellow, viscous product having the following properties:

P (calculated) 3.44%; P (found) 3.35%.
Total acid, 8.17 mg. KOH/gm.

Additional compounds, summarized in the following table, were prepared by a process similar to that outlined in Example 20.

EXAMPLE 26

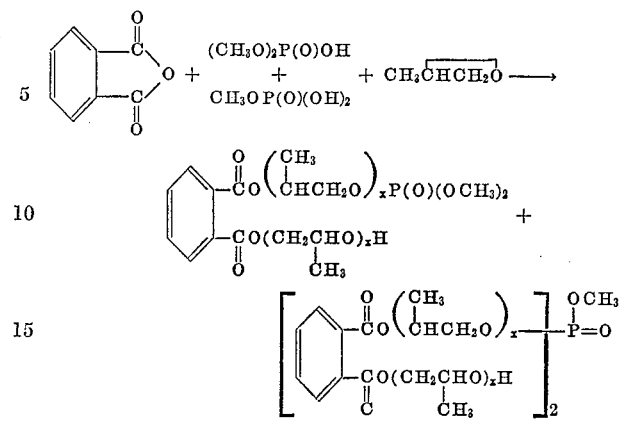

| Compound | x avg. | OH, mg. KOH/gm. Calcd. | Found | P, percent Calcd. | Found | Density, 20/4 | Refractive index at ° C. | Total acid, mg. KOH/gm. |
|---|---|---|---|---|---|---|---|---|
| Example: 21 [see structure] | 1.34 | 158.9 | 161.5 | 4.42 | 4.11 | | | 0.11 |
| 22 [see structure] | 1.35 | 146.4 | 148.5 | 4.08 | 4.05 | | 1.5030 at 24 | 0.08 |
| 23 [see structure] | 1.21 | | | | | | | |
| 24 [see structure] | 1.0 | | | | | | | |
| 25 [see structure] | 1.75 | 145 | 151 | 2.84 | 2.98 | | 1.5072 at 26.5 | 1.3 |

As is apparent from the generic formula set forth hereinbefore, reaction products of mixtures of phosphoric acids (such as those obtained from the reaction of alcohols or phenols with $P_2O_5$) with anhydrides and oxides are embodied herein. This is in addition to the individual members of the mixtures which are set forth in the examples which follow.

Four hundred forty-two and seven-tenths parts of phthalic anhydride, 238.1 parts of a mixture of methyl dihydrogen phosphate and dimethyl hydrogen phosphate having a total acid of 12.55 meg./gm., and 0.17 part of sodium formate were placed in a suitable pressure apparatus equipped as outlined in previous examples. The mixture was heated to a temperature of 80° C., and 347.1 parts of propylene oxide were added thereto, with stirring, over a period of 1 hour and 17 minutes at 80–100° C., and at pressures not exceeding 60 p.s.i. After heating at 96–100° C. for 2 hours, with stirring, the total acid was 102.5 mg. KOH/gm. A further 347.1 parts of propylene oxide was similarly added, after which it was further aged to complete the reaction and stripped of excess oxide. The product was a clear yellow, viscous liquid having the following properties:

OH (calculated), 146 mg. KOH/gm.; OH (found) 149 mg. KOH/gm.

P (calculated), 5.4%; P (found), 5.08%
Density 20/4, 1.235
Specific gravity at 24° C., 1.5006
Total acid, 0.16 mg. KOH/gm.

The following table summarizes other mixtures obtained by processes similar in all material respects to Example 26.

| Example | Compound | x avg. | OH, mg. KOH/gm. Calcd. | OH, mg. KOH/gm. Found | P, Percent Calcd. | P, Percent Found | Density, 20/4 | Refractive index at ° C. | Total acid, mg. KOH/gm. |
|---|---|---|---|---|---|---|---|---|---|
| 27 | $HC-CO(CHCH_2O)_xP(O)(OCH_3)_2$ <br> $HC-CO(CH_2CHO)_xH$ <br> (with $CH_3$ groups) plus $[HC-CO(CHCH_2O)_xP(O)OCH_3 / HC-CO(CH_2CHO)_xH]_2$ | 1.3 | 171 | 160.5 | 6.32 | 6.25 | 1.233 | 1.4665 at 25.5 | 0.37 |
| 28 | $HC-CO(CHCH_2O)_xP(O)(OC_4H_9)_2$ <br> $HC-CO(CH_2CHO)_xH$ plus $[HC-CO(CHCH_2O)_xP(O)OC_4H_9 / HC-CO(CH_2CHO)_xH]_2$ | 1.2 | 155 | 153 | 5.85 | 5.52 | 1.175 | 1.4643 at 21 | 0.15 |
| 29 | tetrabromophthalate $-CO(CHCH_2O)_xP(O)(OCH_3)_2$ / $-CO(CH_2CHO)_xH$ plus tetrabromo dimer with $P(O)OCH_3$ | 1.2 | 81.8 | 72.0 | 3.02 | 3.0 | --- | --- | 0.13 |

| Compound | x avg. | OH, mg. KOH/gm. Calcd. | OH, mg. KOH/gm. Found | P, Percent Calcd. | P, Percent Found | Density, 20/4 | Refractive index at ° C. | Total acid, mg. KOH/gm. |
|---|---|---|---|---|---|---|---|---|
| 30. $\underset{\text{plus}}{\overset{\displaystyle \overset{O}{\underset{\|}{\text{C}}}\text{H}_3}{\underset{\text{CO(CH}_2\text{CHO)}_x\text{H}}{\text{CO(CHCH}_2\text{O)}_x\text{P(O)(OC}_4\text{H}_9\text{i)}_2}}}$ benzene ring with $\left[\begin{array}{c}\text{CO(CHCH}_2\text{O)}_x\underset{\text{CH}_3}{\_}\text{P(O)OC}_4\text{H}_9\text{-i}\\ \text{CO(CH}_2\text{CHO)}_x\text{H}\\\text{CH}_3\end{array}\right]_2$ on benzene | 1.33 | 115 | 135 | 4.44 | 4.16 | 1.127 | 1.4875 at 26.5 | 0.23 |
| 31. $\text{HC}-\text{CO(CHCH}_2\text{O)}_x\text{P(O)(OC}_3\text{H}_{17}\text{-i)}_2$ / $\text{HC}-\text{CO(CH}_2\text{CHO)}_x\text{H}$ with CH$_3$ groups, plus $\left[\begin{array}{c}\text{CO(CHCH}_2\text{O)}_x\text{P(O)OC}_8\text{H}_{17}\text{-i}\\ \text{CO(CH}_2\text{CHO)}_x\text{H}\\\text{CH}_3\end{array}\right]_2$ benzene | 1.19 | 132.5 | 147.5 | 5.10 | 4.69 | 1.101 | 1.4610 at 26 | 0.21 |
| 32. $\underset{\text{plus}}{\overset{\displaystyle \text{CO(CH}_2\text{CH}_2\text{O)}_x\text{P(O)(OC}_6\text{H}_4\text{CH}_3\text{)}_2}{\underset{\text{CO(CH}_2\text{CH}_2\text{O)}_x\text{H}}{}}}$ benzene with $\left[\text{CO(CH}_2\text{CH}_2\text{O)}_x\text{P(O)O-C}_6\text{H}_4\text{CH}_3\right]_2$ benzene | 0.94 | 143 | 131.5 | 5.47 | 5.53 | | | 0.15 |

| Compound | x avg. | OH, mg. KOH/gm. Calcd. | OH, mg. KOH/gm. Found | P, Percent Calcd. | P, Percent Found | Density, 20/4 | Refractive index at °C. | Total acid, mg. KOH/gm. |
|---|---|---|---|---|---|---|---|---|
| 33 — phthalate diester with CH₃ branched oxyalkylene chains terminating in P(O)(OC₆H₅)₂ and (OCH₂CHOH)CH₃ groups; plus phthalate with two (CHCH₂O)ₓ-P(O)(O-C₆H₄-CH₃)₂ chains | 1.42 | 118 | 83 | 4.55 | 4.62 | | | 1.35 |
| 34 — HC—CO(CHCH₂O)ₓP(O)(OC₆H₄CH₃)₂ / HC—CO(CH₂CHO)ₓH CH₃; plus [HC—CO(CHCH₂O)ₓ-P(O)(OC₆H₄CH₃) / HC—CO(CH₂CHO)ₓH CH₃]₂ | 1.34 | 135 | 111 | 5.18 | 5.07 | | | 0.19 |

Other new and useful compounds may be prepared from the compounds of Examples 12–31 by reacting one or more of the reactive centers thereof with a compound of the formula M₂P(O)Hal, wherein M and Hal are as hereinabove defined, substantially as follows.

$$\text{CO}\left(\text{CHCH}_2\text{O}\right)_x\text{P(O)(OC}_8\text{H}_{17})_2 \quad \text{CH}_3$$
$$\text{CO(CH}_2\text{CHO)}_x\text{H} \quad \text{CH}_3$$
(Compound of Example 12)

$$+ (\text{CH}_3\text{O})_2\text{P(O)Cl} + \text{C}_5\text{H}_5\text{N} \rightarrow$$

$$\text{CO(CH}_2\text{CHO)}_x\text{P(O)(OCH}_3)_2 \quad \text{CH}_3$$
$$\text{CO(CH}_2\text{CHO)}_x\text{P(O)(OCH}_3)_2 \quad \text{CH}_3$$

$$+ \text{C}_5\text{H}_5\text{N·HCl}$$

This type of compound may also be obtained from oxyalkylated dicarboxylic acids and the appropriate chloridate. Thus, by reacting 373 parts of $$\text{CO(CH}_2\text{CH}_2\text{O)}_{4.14}\text{H}$$
$$\text{CO(CH}_2\text{CH}_2\text{O)}_{2.21}\text{H}$$

in methylene chloride with 146.2 parts of (CH₃O)₂P(O)Cl at 10° C. or below, there is obtained the compound $$\text{CO(CH}_2\text{CH}_2\text{O)}_{4.14}\text{P(O)(OCH}_3)_2$$
$$\text{CO(CH}_2\text{CH}_2\text{O)}_{2.21}\text{P(O)(OCH}_3)_2$$

having a total acid number of 0.55 and a refractive index of 1.4966 at 25° C.

Additional non-limiting examples of this general class compounds are summarized in the following table.

| Compound of Example | R′ P(O)Hal OR | Moles of R′ P(O)Hal OR |
|---|---|---|
| 13 | (C₂H₅O)₂P(O)Cl | 1 |
| 14 | (C₈H₁₇O)₂P(O)Cl | 1 |
| 15 | (C₆H₅O)₂P(O)Cl | 1 |
| 16 | (C₂H₅O)₂P(O)Cl | 1 |
| 18 | (C₆H₅O)·C₂H₅P(O)Cl | 2 |
| 19 | (C₂H₅O)·CH₃P(O)Cl | 2 |
| 20 | (CH₃O)₂P(O)Cl | 2 |
| 25 | (C₈H₁₇O)₂P(O)Cl | 1 |
| 25 | (C₈H₁₇O)₂P(O)Cl | 2 |
| 25 | (C₈H₁₇O)₂P(O)Cl | 3 |

The following will illustrate those compounds which come within the scope of this invention, and in which there is found an organic radical having a valence of at least two. It is to be understood that the compound shown is merely for the purpose of illustrating the type of compounds contemplated, and it is not to be considered as a limitation on the invention with respect thereto.

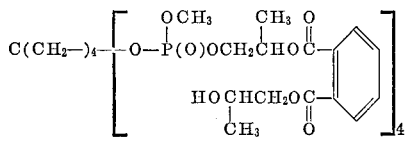

In this compound, $C(CH_2)_4$ corresponds to W, defined hereinabove, and is derived from tetravalent pentaerythritol. Other radicals which are at least divalent may be derived from ethylene glycol, propylene glycol, butylene glycol, glycerol, trimethylol ethane, trimethylol propane, and similar compounds.

The new compounds, especially those containing at least one active hydrogen per molecule, have been found to be useful as flame retardants for polyurethane foams and resins. They markedly improve the flame properties of polyurethanes without any adverse effect on the polymer itself. The degree of fire-retardance will depend upon the amount of phosphorus per se in the finished polyurethane, but as a general statement the compounds of the present invention will be effective at phosphorus concentrations of about 0.5% to about 5.0%, with the preferred amount falling with the range of from about 1.0% to about 3.0%.

Briefly, in using the active hydrogen-containing compounds of the invention to obtain fire-retardant polyurethanes, the compound, or a mixture thereof with a normally used polyol, is mixed with a catalyst and a surfactant, and this is blended with a polyisocyanate, whereupon reaction occurs to produce a polyurethane polymer. If a foam is desired, a slight excess of polyisocyanate will be present in the mixture to be reacted with water (which produces $CO_2$ upon reaction with the excess NCO, thereby supplying the foaming agent). As an alternative, stoichiometric NCO may be used, and a low boiling inert liquid, such as a chlorofluorocarbon, may take the place of the internally produced $CO_2$. In using the compounds of this invention which contain active hydrogens with conventional polyols, it will be obvious to those skilled in this art that the substitution must be done on the basis of active hydrogen equivalents. That is, the amount of phosphorus compound substituted must contain an amount of active hydrogen equivalent to that in the removed conventional polyol.

The polyisocyanates which are useful are those which are well-known in the polyurethane art, and no elaborate discussion of them is believed necessary. As examples, however, the following polyisocyanates may be used to advantage with the inventive compounds. They are: tolylene diisocyanate (a commercial mixture of the 2,4- and the 2,6-isomers); polymethylene polyphenyl isocyanate, having the formula

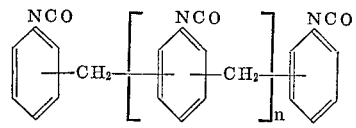

where $n$ is greater than zero; hexamethylene diisocyanate; naphthalene-1,5-diisocyanate; naphthalene triisocyanate; dichloro diphenyl methane diisocyanate; dimethyl diphenylmethane diisocyanate, and other aromatic or aliphatic polyisocyanates containing 2 or more functional or isocyanate groups.

The example which follows will illustrate the usefulness of the compounds of this invention as flame retardants for polyurethane foams.

EXAMPLE 35

One hundred and eighty-four parts of propoxylated sucrose having about 1.2 oxypropylenes per equivalent of hydroxyl, 139 parts of the mixture of Example 27, 4 parts of a silicone-type surfactant L–5310, 3 parts of triethylenediamine catalyst and 87 parts of trichlorofluoromethane were blended together by stirring. To this mixture was added 250 parts of PAPI (polymethylene polyphenyl isocyanate), and this total mixture was stirred vigorously for 23 seconds and poured into a container for foaming. The foam was fully risen and tack free in 98 seconds. It was allowed to stand overnight.

The product, a rigid foam, was fine-celled, and had a density of 2.5 pounds per cubic foot. It had good hydrolytic and dimensional stability at both high humidities (up to 100%) and high temperatures (100–120° C.). The foam burned less than one inch when tested according to ASTM D–1692.

A control, prepared from the agents of this example, less the phosphorus-containing compound, was non-self-extinguishing when tested in accordance with ASTM D–1692.

In addition to their utility as flame retardant agents for polyurethanes, the chemicals of this invention are also useful as flame retardants and plasticizers for vinyl resins, polyesters, and the like.

It is understood that various other modifications will be apparent to and can be made by those having skill in this art without departing from the spirit and scope of the invention. Accordingly, it is not intended that the scope of the claims appended hereto be limited to the description and examples set forth herein, but rather that the claims be construed as encompassing all of the features of patentable novelty which reside in the present invention, including all features which would be treated as equivalents thereof by those skilled in the art to which the invention pertains.

With respect to the value of $x$ in Examples 12 through 31, it will be further understood that the value assigned may not be the exact number of oxyalkyl units attached at the designated center. The values given for $x$ in the various compounds, however, will not vary widely from this actual values. Each $x$ was determined by dividing the total equivalents of alkylene oxide reacted by the number of equivalents of acid hydrogen in the reaction mixture. As an illustration, in Example 13 a total of 2.58 equivalents of ethylene oxide reacted, and this was assumed to be divided equally between the two acid hydrogens present—one from the phosphorus moiety and one from the opening of the anhydride ring. Thus $x$ is an average value which, when multiplied by the number of $x$'s in the molecule, will enable one to determine the actual amount of oxyalkyl present in the chemical in question. The values of $x$ in the appended claims are to be interpreted in view of this explanation.

We claim:

1. An organo-phosphorus compound selected from the formulas

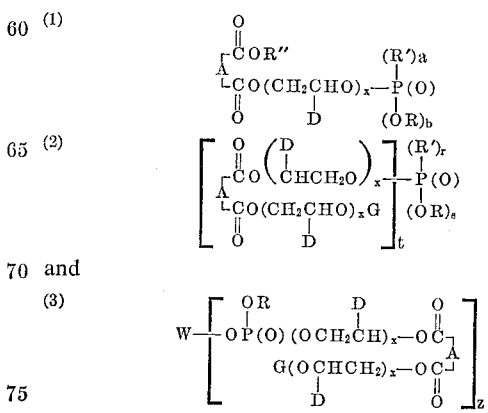

wherein:
R is a member of the group consisting of (lower) alkoxy (lower) alkyl, alkyl containing from 1 to 18 carbon atoms, aryl, alkyl-substituted aryl wherein the alkyl contains from 1 to 18 carbon atoms, chloro-substituted aryl, bromo-substituted aryl, aralkyl, and

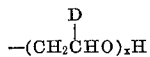

wherein D and $x$ are as hereinafter defined;
R' is a member of the group consisting of hydrogen, alkyl containing from 1 to 18 carbon atoms, and phenyl;
R'' is a member of the group consisting of alkyl containing from 1 to 13 carbon atoms and (lower) alkoxy (lower) alkyl;
A is the nucleus of a member selected from the group consisting of aromatic dicarboxylic acid anhydrides and aliphatic dicarboxylic acid anhydrides;
D is a member of the group consisting of hydrogen, lower alkyl, and chloro (lower) alkyl;
G is a member of the group consisting of hydrogen and

wherein R and R' are as hereinbefore defined, and $a$ and $b$ are as defined hereinafter;
$a$ and $b$ are each 0 to 2, their sum being 2;
$r$, $s$, and $t$ are, respectively, 0 to 2, 0 to 2 and 1 to 3, their sum being 3;
W is the hydrocarbyl nucleus of a polyhydroxy compound containing from 2 to 4 hydroxyls;
$x$ has an average value of from about 1.0 to about 5.0; and
$z$ is an integer corresponding to the number of hydroxyls in W.

2. The compound of claim 1 wherein A is the nucleus of a dicarboxylic acid anhydride selected from the group consisting of (1) phthalic, halogen-substituted phthalic, nitro-substituted phthalic, alkyl-substituted phthalic, homophthalic, naphthalic, (2) adipic, azeleic, glutanic, suberic, itaconic, pimelic, succinic, maleic, (3) the halogen-substituted and alkyl-substituted members of the aforesaid group (2), (3) chlorendic, hydrophthalic, and endomethylene phthalic anhydrides.

3. An organo-phosphorus compound selected from the formulas (1) 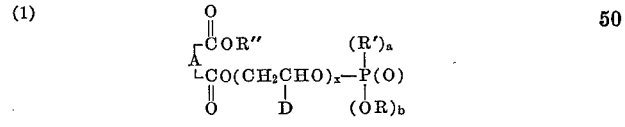

(2) 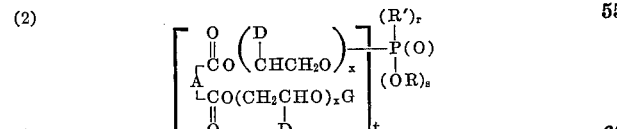

and (3) 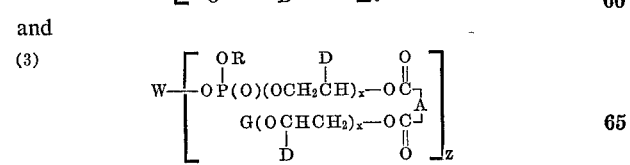

wherein:
R is a member of the group consisting of (lower) alkoxy (lower) alkyl, alkyl containing from 1 to 18 carbon atoms, aryl, alkyl-substituted aryl wherein the alkyl contains from 1 to 18 carbon atoms, chloro-substituted aryl, bromo-substituted aryl, aralkyl, and

wherein D and $x$ are as hereinafter defined;
R' is a member of the group consisting of hydrogen, alkyl containing from 1 to 18 carbon atoms, and phenyl;
R'' is a member of the group consisting of alkyl containing from 1 to 13 carbon atoms and (lower) alkoxy (lower) alkyl;
A is the nucleus of a member selected from the group consisting of phthalic, chloro-substituted phthalic, bromo-substituted phthalic, iodo-substituted phthalic, nitro-substituted phthalic, alkyl-substituted phthalic wherein the alkyl contains from 1 to 12 carbon atoms, homophthalic and naphthalic anhydrides;
D is a member of the group consisting of hydrogen, $CH_3$, $C_2H_5$ and $ClCH_2$;
G is a member of the group consisting of hydrogen and

wherein R and R' are as hereinbefore defined, and $a$ and $b$ are as defined hereinafter;
$a$ and $b$ are each 0 to 2, their sum being 2;
$r$, $s$, and $t$ are, respectively, 0 to 2, 0 to 2 and 1 to 3, their sum being 3;
W is the hydrocarbyl nucleus of a polyhydroxy compound containing from 2 to 4 hydroxyls;
$x$ has an average value of from about 1.0 to about 5.0; and
$z$ is an integer corresponding to the number of hydroxyls in W.

4. The compound of claim 3, Formula 2, in which $r$ is 0, R is methyl, G is hydrogen, D is $CH_3$, and A is the nucleus of tetrabromophthalic anhydride.

5. The compound as defined in claim 4, having the structure

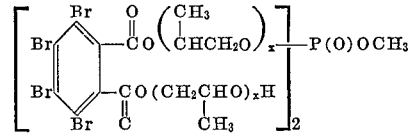

6.

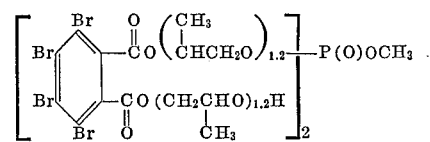

7. The compound of claim 4, having the structure

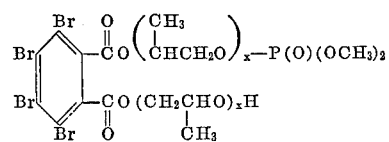

8.

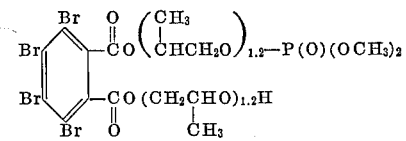

9. The compound of claim 1 wherein A is the nucleus of a member selected from the group consisting of hydrophthalic, endomethylene phthalic, camphoric, 5-norbornene-2, and chlorendic anhydrides, and D is a member of the group consisting of hydrogen, $CH_3$, $C_2H_5$ and $ClCH_2$.

10. The compound of claim 1, having the structure

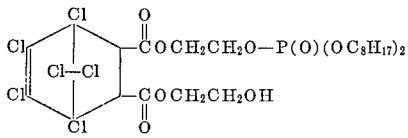

11. The compound of claim 1 wherein A is the nucleus of a member selected from the group consisting of: (1) adipic, azeleic, glutaric, suberic, itaconic, pimelic, and succinic acid anhydrides; (2) the chloro-substituted members of (1); and (3) the alkyl-substituted members of (1), wherein alkyl contains from 1 to 12 carbon atoms; and D is selected from the group consisting of hydrogen, $CH_3$, $C_2H_5$, and $ClCH_2$.

12. The compound of claim 1, Formula 2, wherein $r$ is 0, R is methyl, G is hydrogen, D is $CH_3$ and A is the nucleus of maleic anhydride.

13. The compound as defined in claim 12, having the structure

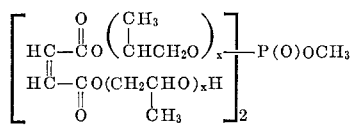

14. The compound of claim 12, having the structure

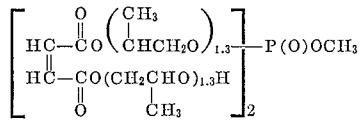

15. The compound as defined in claim 12, having the structure

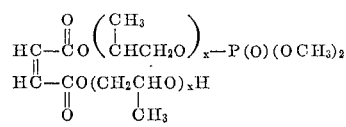

16. The compound of claim 12, having the structure

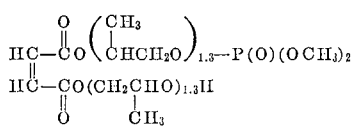

17. A process for the manufacture of an organo-phosphorus compound as defined in claim 1, Formulas 2 and 3, which comprises the simultaneous reaction of the appropriate phosphorus compound having at least one acid function, a dicarboxylic acid anhydride having A as its nucleus, and a compound selected from the group consisting of ethylene oxide, propylene oxide, butylene oxide and epichlorohydrin.

18. A process for the manufacture of an organophosphorus compound as defined in claim 3, Formulas 2 and 3, which comprises the simultaneous reaction of the appropriate phosphorus compound having at least one acid function, a dicarboxylic acid anhydride selected from the group consisting of phthalic, chloro-substituted phthalic, bromo-substituted phthalic, iodo-substituted phthalic, nitro-substituted phthalic, alkyl-substituted phthalic wherein the alkyl contains from 1 to 12 carbon atoms, homophthalic and naphthalic anhydrides, and a compound selected from the group consisting of ethylene oxide, propylene oxide, butylene oxide, and epichlorohydrin.

19. The process as defined in claim 18 wherein the compound produced falls within Formula 2 in which $r$ is 0, R is methyl, G is hydrogen, D is $CH_3$, and A is the nucleus of tetrabromophthalic anhydride.

20. The process as defined in claim 19 wherein the organo-phosphorous compound obtained is

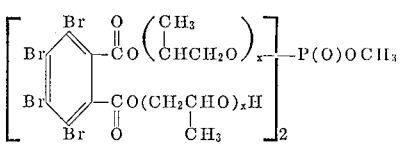

21. The process as defined in claim 20 wherein $x$ is 1.2.

22. The process as defined in claim 19 wherein the organo-phosphorus compound is

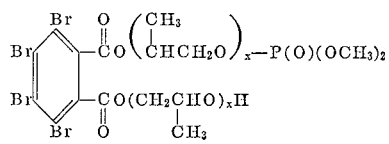

23. The process as defined in claim 22 wherein $x$ is 1.2.

24. The process as defined in claim 18 which comprises mixing the dicarboxylic acid anhydride and phosphorus compound, subsequently adding thereto an excess of said oxide at a temperature of from about 70° C. to about 95° C., heating at a temperature sufficiently high to complete neutralization of the carboxyl acid functions formed, but not higher than about 160° C., and then removing the excess oxide from the said organo-phosphorus compound.

25. The process of claim 18 which comprises the steps of mixing the dicarboxylic acid anhydride and phosphorus compound and subsequently adding said oxide thereto, the oxide being in excess of the amount necessary to react with all of the acid functions of the said phosphorus compound and the subsequently formed carboxyl group, at temperatures sufficiently high to react the said oxide and the said acid functions, and removing the excess oxide from the organo-phosphorus compound thus formed.

References Cited

UNITED STATES PATENTS 3,092,543  6/1963  Richter _____ 260—952 X

CHARLES B. PARKER, Primary Examiner

R. L. RAYMOND, Assistant Examiner

U.S. Cl. X.R.

252—8.1; 260—928, 929, 930, 971, 973, 978, 453, 2.5, 77.5

UNITED STATES PATENT OFFICE
CERTIFICATE OF CORRECTION

Patent No. 3,465,068      Dated September 2, 1969

Inventor(s) VASCO G. CAMACHO, JAMES, J. ANDERSON, and WENDELL M. BYRD, JR.

It is certified that error appears in the above-identified patent and that said Letters Patent are hereby corrected as shown below:

In column 1, formula (3), that portion reading $$F(O\underset{D}{C}HCH_2)_x\text{---}$$

should read $$G(O\underset{D}{C}HCH_2)_x\text{---}$$

Column 4, line 31, "product from" should read --product obtained from--. Column 4, line 54, "form" should read --from--. Column 6, Example 2, that portion of the third formula reading $$P(O) \ OCH_3)_2$$

should read $$P(O)(OCH_3)_2$$

Column 9, Example 16, that portion reading $$(CH_2\underset{CH_3}{C{+}O})_xH$$

should read $$(CH_2\underset{CH_3}{C}HO)_xH$$

Column 9, Example 18, that portion reading $\underset{O}{\overset{CO}{\|}}$ should read $\text{---}\underset{O}{\overset{CO}{\|}}$ Column 14, Example 29, that portion in brackets reading
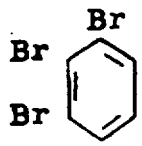
should read
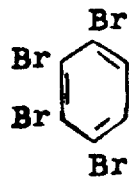
Column 16, Example 31, that portion in brackets reading
$(CHCH_2O)_x$
should read
$$\begin{matrix} CH_3 \\ | \\ (CHCH_2O)_x \end{matrix}$$
In claim 5, that portion of the formula reading 
should read 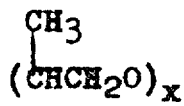

Notice of Adverse Decision in Interference

In Interference No. 97,940 involving Patent No. 3,465,068, V. G. Camacho, J. J. Anderson and W. M. Byrd, Jr., PHOSPHORUS-CONTAINING ESTERS AND PROCESS THEREFOR, final judgment adverse to the patentees was rendered Aug. 4, 1972, as to claims 1, 2, 3, 9, 11, 17, 18 and 25.

[*Official Gazette October 31, 1972.*]